US012304524B2

(12) United States Patent
Nakamura et al.

(10) Patent No.: US 12,304,524 B2
(45) Date of Patent: May 20, 2025

(54) VEHICLE CONTROL SYSTEM AND METHOD OF CONTROLLING VEHICLE

(71) Applicant: TOYOTA JIDOSHA KABUSHIKI KAISHA, Toyota (JP)

(72) Inventors: Satoshi Nakamura, Susono (JP); Sho Hashimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 18/076,919

(22) Filed: Dec. 7, 2022

(65) Prior Publication Data

US 2023/0192125 A1 Jun. 22, 2023

(30) Foreign Application Priority Data

Dec. 21, 2021 (JP) .................................. 2021-206979

(51) Int. Cl.
*B60W 60/00* (2020.01)
*B60W 50/14* (2020.01)

(52) U.S. Cl.
CPC .......... *B60W 60/001* (2020.02); *B60W 50/14* (2013.01); *B60W 2556/10* (2020.02)

(58) Field of Classification Search
CPC ............... B60W 60/001; B60W 50/14; B60W 2556/10; B60W 30/18154; B60W 60/0015; B60W 2050/143
See application file for complete search history.

(56) References Cited

U.S. PATENT DOCUMENTS

| 10,372,130 B1* | 8/2019 | Kaushansky ....... B60W 60/001 |
| 11,565,699 B1* | 1/2023 | Ravella ........... B60W 30/18127 |
| 2016/0132705 A1* | 5/2016 | Kovarik .................. G01S 13/74 340/10.3 |
| 2016/0171894 A1* | 6/2016 | Harvey ................ G05D 1/0027 701/23 |
| 2017/0234691 A1* | 8/2017 | Abramson ......... G01C 21/3626 701/442 |
| 2017/0313326 A1* | 11/2017 | Sweeney ............... B60W 40/10 |

(Continued)

FOREIGN PATENT DOCUMENTS

| JP | 2010-105454 A | 5/2010 |
| JP | 2017-117342 A | 6/2017 |

(Continued)

*Primary Examiner* — Mussa A Shaawat
(74) *Attorney, Agent, or Firm* — Dinsmore & Shohl LLP

(57) ABSTRACT

The vehicle-travel control device estimates an evaluation level of the automated-driving management device from the standpoint of the vehicle-travel control device, when the vehicle is approaching a caution point indicating a point where caution needs to be exercised in driving, determines whether the vehicle-travel control device has a history of passing through the caution point with the vehicle-travel control device having received an execution prohibition instruction to prohibit execution of the travel assistance control, and when the vehicle-travel control device has received the execution prohibition instruction, and it is determined that the vehicle-travel control device does not have a history of passing through the caution point, changes an execution mode of the travel assistance control based on the evaluation level such that the travel assistance control is more likely to be executed.

11 Claims, 11 Drawing Sheets

(56) References Cited

U.S. PATENT DOCUMENTS

| | | |
|---|---|---|
| 2018/0188045 A1* | 7/2018 | Wheeler ................. G06V 10/98 |
| 2018/0370529 A1 | 12/2018 | Matsunaga |
| 2019/0086550 A1* | 3/2019 | Dussan ................ G02B 26/108 |
| 2019/0113351 A1* | 4/2019 | Antony ........... B60W 30/18145 |
| 2020/0193829 A1* | 6/2020 | Cheng .................... G08G 1/168 |
| 2020/0269870 A1* | 8/2020 | Verbeke ................. B60K 35/25 |
| 2020/0293057 A1* | 9/2020 | Reid ...................... G06N 20/20 |
| 2021/0004017 A1* | 1/2021 | Colgate ................. G01C 21/30 |
| 2021/0107516 A1 | 4/2021 | Fujita et al. |
| 2021/0107522 A1 | 4/2021 | Goto et al. |
| 2023/0176573 A1* | 6/2023 | Kumavat ............. G05D 1/0038 |
| | | 701/23 |
| 2023/0356728 A1* | 11/2023 | Jain ........................ G06F 3/013 |

FOREIGN PATENT DOCUMENTS

| | | |
|---|---|---|
| JP | 6772527 B2 | 10/2020 |
| JP | 2021-062778 A | 4/2021 |
| JP | 2021-062783 A | 4/2021 |

\* cited by examiner

VEHICLE CONTROL SYSTEM AND METHOD OF CONTROLLING VEHICLE

CROSS-REFERENCE TO RELATED APPLICATION

The present application claims priority under 35 U.S.C. § 119 to Japanese Patent Application No. 2021-206979, filed Dec. 21, 2021, the contents of which application are incorporated herein by reference in their entirety.

BACKGROUND

Technical Field

The present disclosure relates to a system and method that control an automated driving vehicle.

Background Art

Patent Literature 1 discloses a technique in which a vehicle control device automatically performs a driving assistance operation the execution of which is allowed by the driver, out of a plurality of driving assistance operations. In this technique, switching the setting of the driving assistance operation is suggested to the driver to perform automated driving suitable for the situation.

LIST OF RELATED ART

Patent Literature 1: JP 6772527 B2

SUMMARY

Meanwhile, in automated driving in recent years, "vehicle travel control" is performed for the vehicle to follow a target trajectory. The target trajectory is generated, for example, by a management device that manages automated driving, and vehicle travel control is executed by a control device that controls the travel of the vehicle. Hereinafter, a control device that manages automated driving is referred to as an "automated-driving management device", and a control device that controls the travel of the vehicle is referred to as a "vehicle-travel control device".

Consider a case in which a device having a function the same as or similar to the target-trajectory generation function included in the automated-driving management device is mounted on a vehicle, superseding the automated-driving management device. In this case, the vehicle-travel control device will execute vehicle travel control, following a target trajectory generated by the superseding automated-driving management device.

A problem here is that the target trajectory generated by the superseding automated-driving management device can sometimes be inappropriate from the viewpoint of the travel safety of the vehicle. Hence, it is conceivable that the vehicle-travel control device executes as appropriate various kinds of travel assistance control set before the replacement. However, it is also conceivable that the superseding automated-driving management device outputs another instruction to prohibit execution of such travel assistance control to the vehicle-travel control device in order to make the vehicle-travel control device keep the target trajectory generated by itself. In such a case, the vehicle-travel control device cannot be involved in automated driving at all, and thus, there is a problem that it is difficult to ensure the travel safety of the vehicle from the standpoint of the vehicle-travel control device.

An object of the present disclosure is to provide a technique to ensure the travel safety of the vehicle from the standpoint of the vehicle-travel control device even in a situation in which execution of the travel assistance control by the vehicle-travel control device is prohibited by the automated-driving management device.

A first aspect relates to a vehicle control system including: an automated-driving management device that generates a target trajectory for a vehicle; and a vehicle-travel control device that executes vehicle travel control for the vehicle to follow the target trajectory and travel assistance control for the vehicle.

The vehicle-travel control device also estimates an evaluation level of the automated-driving management device from the standpoint of the vehicle-travel control device.

In addition, the vehicle-travel control device, when the vehicle is approaching a caution point indicating a point where caution needs to be exercised in driving, determines whether the vehicle-travel control device has a history of passing through the caution point with the vehicle-travel control device having received an execution prohibition instruction to prohibit execution of the travel assistance control.

In addition, the vehicle-travel control device, when the vehicle-travel control device has received the execution prohibition instruction, and it is determined that the vehicle-travel control device does not have a history of passing through the caution point, changes an execution mode of the travel assistance control based on the evaluation level such that the travel assistance control is more likely to be executed.

A second aspect further has the following feature in addition to the first aspect.

The vehicle-travel control device, when the vehicle-travel control device has received the execution prohibition instruction, and it is determined that the vehicle-travel control device has a history of passing through the caution point, changes the execution mode based on the evaluation level such that the travel assistance control is less likely to be executed.

A third aspect further has the following feature in addition to the first or the second aspect.

The execution mode includes an execution item of the travel assistance control and execution time of the travel assistance control.

A fourth aspect further has the following feature in addition to the third aspect.

The execution item includes an alarm for notifying an occupant that the vehicle is approaching the caution point and at least one vehicle operation out of steering, acceleration, and deceleration of the vehicle performed at a point short of the caution point when the vehicle passes through the caution point.

A fifth aspect further has the following feature in addition to the first to fourth aspects.

The evaluation level is estimated based on at least one factor out of reception frequency of the execution prohibition instruction, travel stability of the vehicle following the target trajectory, and travel safety of the vehicle following the target trajectory.

A sixth aspect relates to a vehicle control system including: an automated-driving management device that generates a target trajectory for a vehicle; and a vehicle-travel control device that executes vehicle travel control for the vehicle to follow the target trajectory and travel assistance control for the vehicle.

The vehicle-travel control device determines whether an evaluation level of the automated-driving management device from the standpoint of the vehicle-travel control device is lower than a threshold.

The vehicle-travel control device, when the vehicle is approaching a caution point indicating a point where caution needs to be exercised in driving, and it is determined that the evaluation level is lower than the threshold, changes an execution mode of the travel assistance control such that the travel assistance control is more likely to be executed.

A seventh aspect further has the following feature in addition to the sixth aspect.

The vehicle-travel control device, when the vehicle is approaching a point where caution needs to be exercised in driving, and it is determined that the evaluation level is higher than or equal to the threshold, changes the execution mode of the travel assistance control such that the travel assistance control is less likely to be executed.

An eighth aspect further has the following feature in addition to the sixth or the seventh aspect.

The execution mode includes an execution item of the travel assistance control and execution time of the travel assistance control.

A ninth aspect further has the following feature in addition to the eighth aspect.

The execution item includes an alarm for notifying an occupant that the vehicle is approaching the caution point and at least one vehicle operation out of steering, acceleration, and deceleration of the vehicle performed at a point short of the caution point when the vehicle passes through the caution point.

A tenth aspect further has the following feature in addition to the sixth to ninth aspects. The evaluation level is estimated based on at least one factor out of travel stability of the vehicle following the target trajectory and travel safety of the vehicle following the target trajectory.

An eleventh aspect relates to a method of controlling a vehicle, involving execution of vehicle travel control for the vehicle to follow a target trajectory for the vehicle and travel assistance control for the vehicle.

The method of controlling a vehicle includes:
a step of estimating an evaluation level of an automated-driving management device that generates the target trajectory;
a step of determining, when the vehicle is approaching a caution point indicating a point where caution needs to be exercised in driving, whether a vehicle-travel control device has a history of passing through the caution point in a state of having received an execution prohibition instruction to prohibit execution of the travel assistance control from the automated-driving management device; and
a step of changing, when the vehicle-travel control device has received the execution prohibition instruction, and it is determined that the vehicle-travel control device does not have a history of passing through the caution point, an execution mode of the travel assistance control based on the evaluation level such that the travel assistance control is more likely to be executed.

A twelfth aspect relates to a method of controlling a vehicle, involving execution of vehicle travel control for the vehicle to follow a target trajectory for the vehicle and travel assistance control for the vehicle.

The method of controlling a vehicle includes:
a step of determining whether an evaluation level of an automated-driving management device that generates the target trajectory is lower than a threshold; and
a step of changing, when the vehicle is approaching a caution point indicating a point where caution needs to be exercised in driving, and it is determined that the evaluation level is lower than the threshold, an execution mode of the travel assistance control such that the travel assistance control is more likely to be executed.

According to the first aspect, in the case in which the vehicle-travel control device has received an execution prohibition instruction, and it is determined that the vehicle-travel control device does not have a history of passing through the caution point, the vehicle-travel control device changes the execution mode of the travel assistance control based on the evaluation level such that the travel assistance control is more likely to be executed. With this configuration, even in the situation in which execution of the travel assistance control by the vehicle-travel control device is prohibited by the automated-driving management device, it is possible to ensure the travel safety of the vehicle from the standpoint of the vehicle-travel control device.

According to the second aspect, in the case in which the vehicle-travel control device has received an execution prohibition instruction, and it is determined that the vehicle-travel control device has a history of passing through the caution point, the vehicle-travel control device changes the execution mode based on the evaluation level such that the travel assistance control is less likely to be executed. With this configuration, even in the situation in which execution of the travel assistance control by the vehicle-travel control device is prohibited by the automated-driving management device, it is possible to ensure the travel safety of the vehicle from the standpoint of the vehicle-travel control device.

According to the third aspect, it is possible to change the execution items and execution time of the travel assistance control.

According to the fourth aspect, it is possible to determine the execution items of the travel assistance control.

According to the fifth aspect, it is possible to estimate the evaluation level.

According to the sixth aspect, if it is determined that the evaluation level is lower than the threshold, the vehicle-travel control device changes the execution mode of the travel assistance control such that the travel assistance control is more likely to be executed. With this configuration, it is possible to ensure the travel safety of the vehicle from the standpoint of the vehicle-travel control device, based on the evaluation level of the automated-driving management device from the standpoint of the vehicle-travel control device.

According to the seventh aspect, if it is determined that the evaluation level is higher than or equal to the threshold, the vehicle-travel control device changes the execution mode of the travel assistance control such that the travel assistance control is less likely to be executed. With this configuration, it is possible to ensure the travel safety of the vehicle from the standpoint of the vehicle-travel control device, based on the evaluation level of the automated-driving management device from the standpoint of the vehicle-travel control device.

The eighth aspect provides the same effects as the third aspect.

The ninth aspect provides the same effects as the fourth aspect.

The tenth aspect provides the same effects as the fifth aspect.

The eleventh aspect provides the same effects as the first aspect.

The twelfth aspect provides the same effects as the sixth aspect.

DETAILED DESCRIPTION

A vehicle control system and a method of controlling a vehicle according to embodiments of the present disclosure will be described with reference to the attached drawings. Note that the method of controlling a vehicle according to the embodiments is achieved by a computer process of the vehicle control system according to the embodiments.

First Embodiment

1. Overview

Figure 1:
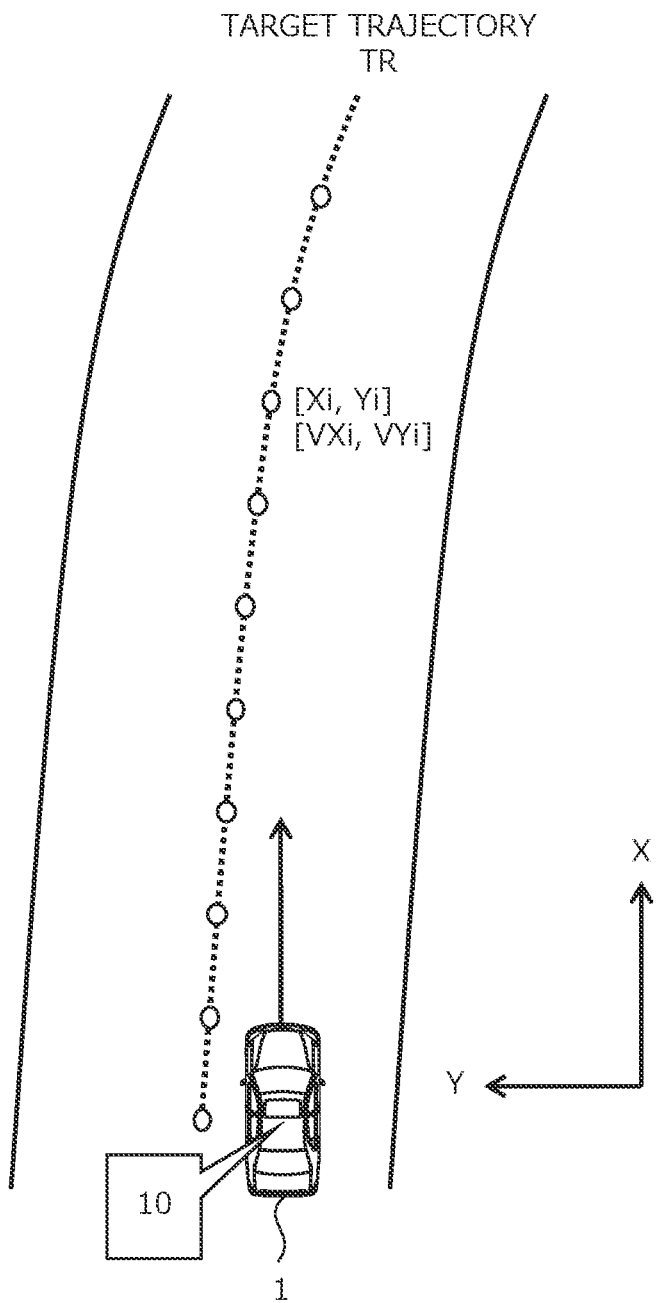
FIG. 1 is a conceptual diagram for explaining an overview of a vehicle control system according to a first embodiment.

FIG. 1 is a conceptual diagram for explaining an overview of a vehicle control system 10 according to the present embodiment. The vehicle control system 10 controls a vehicle 1. The vehicle control system 10 is typically mounted on the vehicle 1. At least part of the vehicle control system 10 may be located in an external device outside the vehicle 1 or may control the vehicle 1 remotely. In other words, the vehicle control system 10 may be a distributed system composed of components located on the vehicle 1 and ones in an external device.

The vehicle 1 is an automated driving vehicle capable of automated driving. The automated driving mentioned here is assumed to be that based on the premise that the driver does not necessarily have to concentrate 100% of the driver's attention on driving (for example, automated driving at level 3 or higher as it is called).

The vehicle control system 10 manages the automated driving of the vehicle 1. The vehicle control system 10 executes "vehicle travel control" for controlling the steering, acceleration, and deceleration of the vehicle 1. In particular, during automated driving, the vehicle control system 10 executes vehicle travel control such that the vehicle 1 will follow a target trajectory TR.

The target trajectory TR includes at least a set of target positions [Xi, Yi] of the vehicle 1 in the traffic lane in which the vehicle 1 is traveling. In the example shown in FIG. 1, the X direction is the forward direction of the vehicle 1, and the Y direction is the planar direction orthogonal to the X direction. However, the coordinate system (X, Y) is not limited to the example shown in FIG. 1. The target trajectory TR may include the target velocity [VXi, VYi] at each target position [Xi, Yi]. To make the vehicle 1 follow the target trajectory TR described above, the vehicle control system 10 calculates the deviation between the vehicle 1 and the target trajectory TR (for example, the lateral deviation, the yaw-angle deviation, and the velocity deviation) and performs vehicle travel control so as to reduce the deviation.

Figure 2:
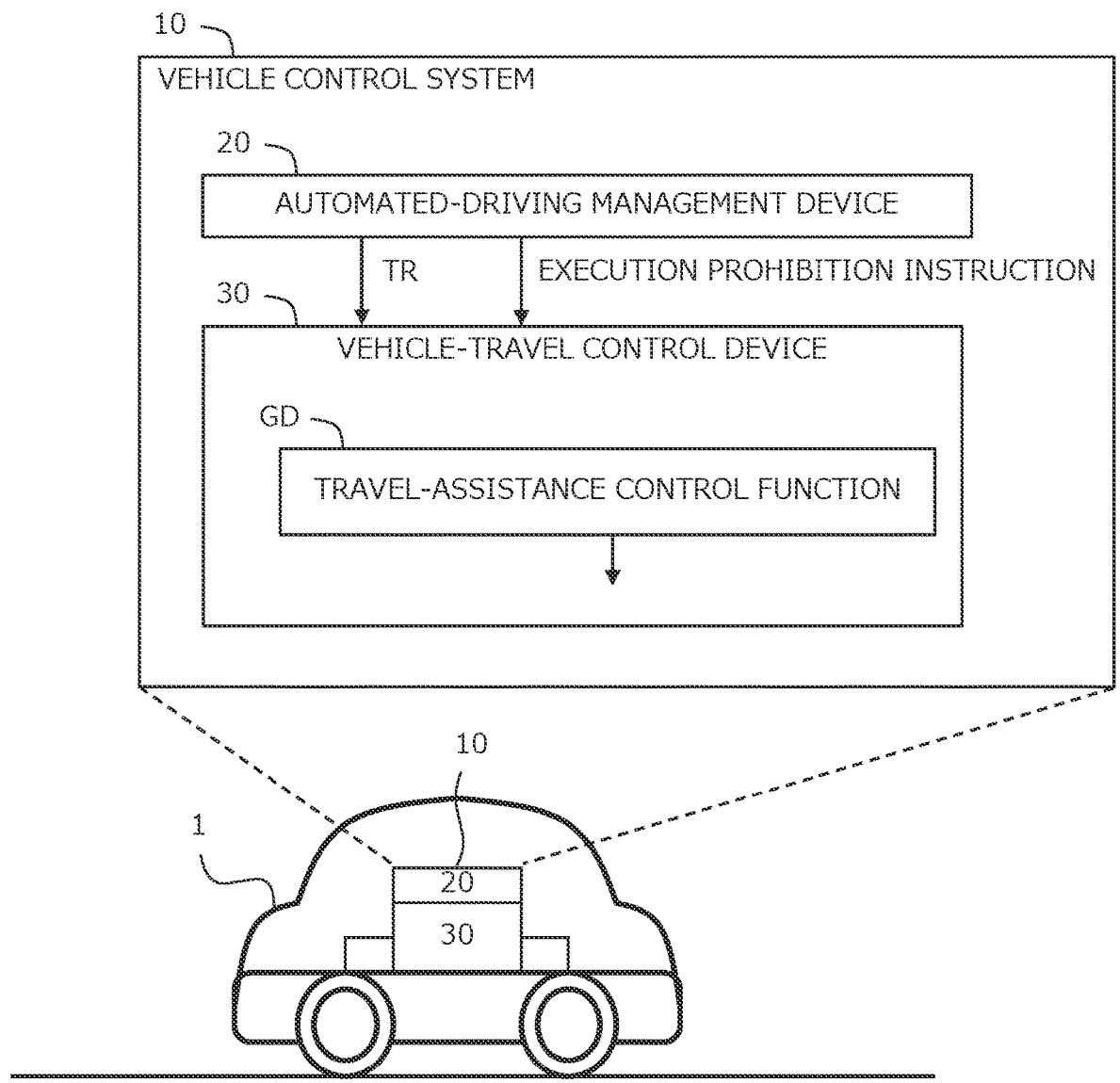
FIG. 2 is a block diagram schematically showing the configuration of the vehicle control system according to the first embodiment.

FIG. 2 is a block diagram schematically showing the configuration of the vehicle control system 10 according to the present embodiment. The vehicle control system 10 includes an automated-driving management device 20 and a vehicle-travel control device 30. The automated-driving management device 20 and the vehicle-travel control device 30 may be physically separate devices or may be in one device. In the case in which the automated-driving management device 20 and the vehicle-travel control device 30 are physically separate devices, these devices exchange necessary information via communication.

The automated-driving management device 20, out of the functions of the vehicle control system 10, serves to manage the automated driving of the vehicle 1. In particular, the automated-driving management device 20 generates the target trajectory TR for the automated driving of the vehicle 1. For example, the automated-driving management device 20 detects (recognizes) conditions around the vehicle 1 with sensors. The automated-driving management device 20 generates a travel plan for the vehicle 1 in automated driving, based on the conditions around the vehicle 1 and the destination. The travel plan includes maintaining the current travel lane, changing traffic lanes, and avoiding obstacles. Then, the automated-driving management device 20 generates a target trajectory TR necessary for the vehicle 1 to travel according to the travel plan. The automated-driving management device 20 outputs the generated target trajectory TR to the vehicle-travel control device 30.

Next, the vehicle-travel control device 30, out of the functions of the vehicle control system 10, serves to perform vehicle travel control. Specifically, the vehicle-travel control device 30 controls the steering, acceleration, and deceleration of the vehicle 1. In particular, the vehicle-travel control device 30 controls the steering, acceleration, and deceleration of the vehicle 1 such that the vehicle 1 will follow the target trajectory TR. To make the vehicle 1 follow the target trajectory TR, the vehicle-travel control device 30 calculates the deviation between the vehicle 1 and the target trajectory TR (for example, the lateral deviation, the yaw-angle deviation, and the velocity deviation) and performs vehicle travel control so as to reduce the deviation.

When the vehicle 1 is performing automated driving, the vehicle-travel control device 30 receives the target trajectory TR from the automated-driving management device 20. Basically, the vehicle-travel control device 30 performs vehicle travel control such that the vehicle 1 will follow the target trajectory TR.

The vehicle-travel control device 30 further includes a function of "travel assistance control" (a travel-assistance control function GD) for assisting the travel of the vehicle 1. The travel assistance control, on the purpose of improving the travel safety of the vehicle 1, gives an alarm to notify the occupant that the vehicle 1 is approaching a point where caution needs to be exercised (hereinafter, referred to as a "caution point") and performs at least one vehicle operation out of the steering, acceleration, and deceleration of the vehicle 1 at a point short of the caution point when the vehicle 1 is passing through the caution point. Examples of caution points include blind intersections, accident-prone points, and high-frequency sudden braking points.

When the vehicle-travel control device 30 executes the travel assistance control, the vehicle-travel control device 30 switches from the vehicle operation by the vehicle travel control to that by the travel assistance control. However, in order for the automated-driving management device 20 to make the vehicle-travel control device 30 obey the target trajectory TR generated by itself, it is assumed that the automated-driving management device 20 outputs another instruction to the vehicle-travel control device 30 to prohibit execution of such travel assistance control (hereinafter an "execution prohibition instruction"). In this case, the vehicle-travel control device 30 cannot switch to the vehicle operation by the travel assistance control and thus the vehicle travel control is prioritized.

Figure 3:
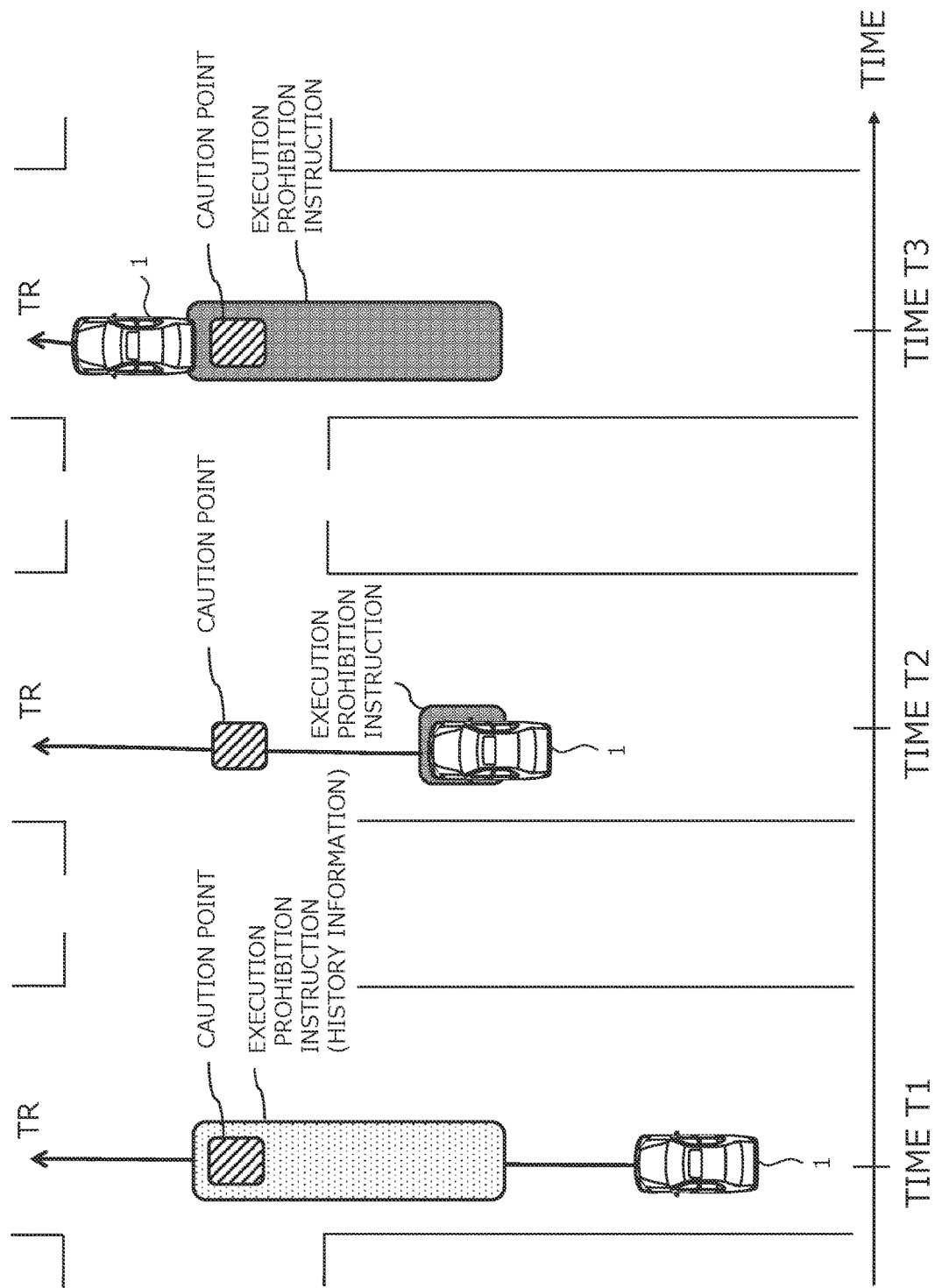
FIG. 3 is a conceptual diagram for explaining an example of travel assistance control according to the first embodiment.

FIG. 3 is a conceptual diagram for explaining an example of travel assistance control according to the present embodiment. Here is shown an execution example of the travel assistance control for the case of passing through a caution point. Specifically, think about a case in which the vehicle 1 in which the vehicle-travel control device 30 has a history of passing through the caution point with the vehicle-travel control device 30 having received an execution prohibition instruction to prohibit execution of the travel assistance control is traveling so as to follow the target trajectory TR and passing through a caution point. In this case, considering that the vehicle-travel control device 30 has a history of passing through the caution point with the vehicle-travel control device 30 having received an instruction to prohibit execution of the travel assistance control, there is a possibility that the automated-driving management device 20 can output an execution prohibition instruction to the vehicle-travel control device 30 when the vehicle 1 passes through the same place again. If the automated-driving management device 20 outputs an execution prohibition instruction to the vehicle-travel control device 30, the vehicle-travel control device 30 cannot switch to the vehicle operation by the travel assistance control, and then the vehicle travel control will be prioritized.

Figure 4:
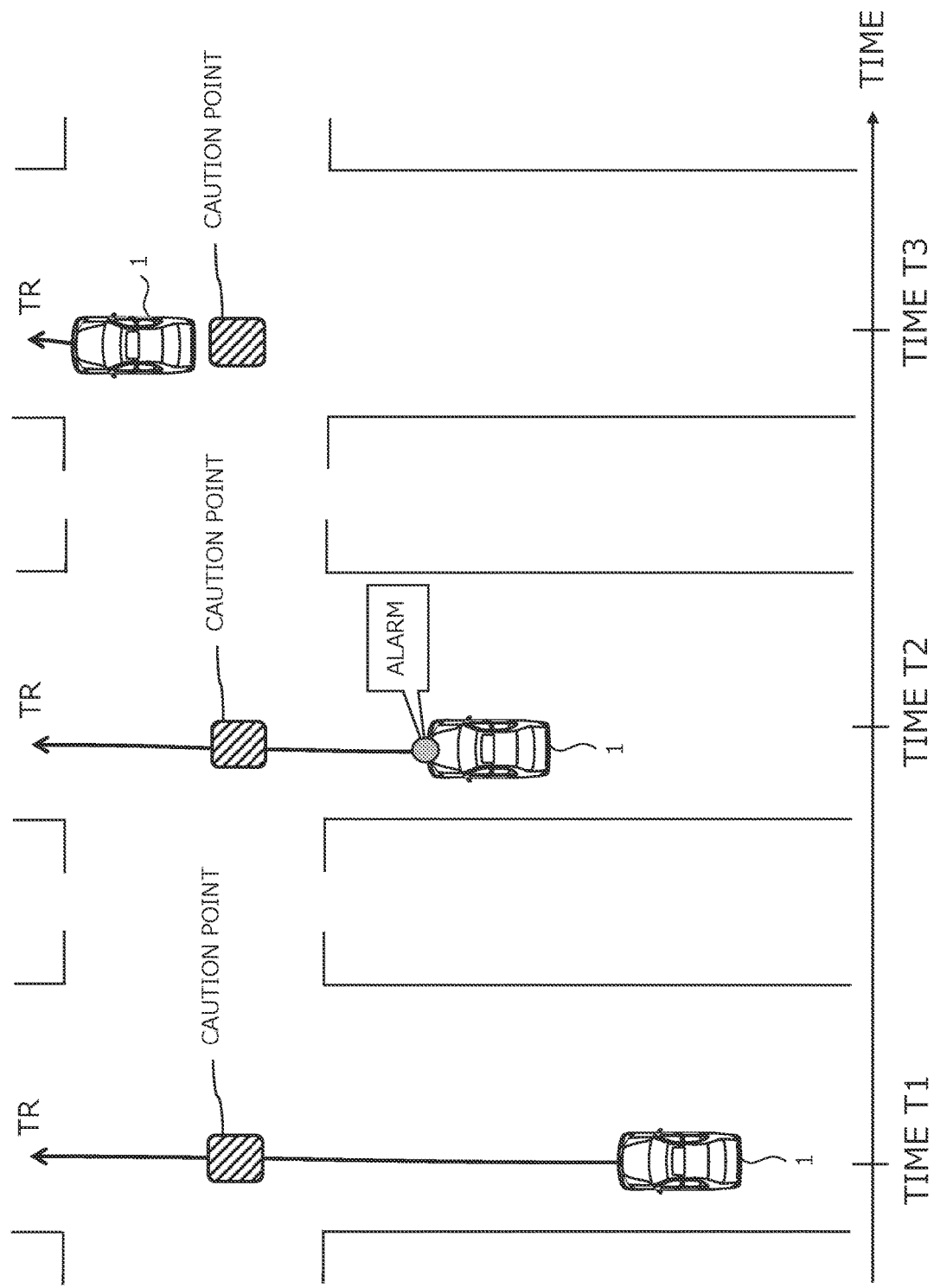
FIG. 4 is a conceptual diagram for explaining an example of the travel assistance control according to the first embodiment.

Next, FIG. 4 shows an example in which the vehicle-travel control device 30 does not have a history of passing through the caution point with the vehicle-travel control device 30 having received an instruction to prohibit execution of the travel assistance control, and the vehicle 1 traveling so as to follow the target trajectory TR is passing through the caution point. In this case, considering that the vehicle-travel control device 30 does not have a history of passing through the caution point with the vehicle-travel control device 30 having received an instruction to prohibit execution of the travel assistance control, it is less likely that the automated-driving management device 20 outputs an execution prohibition instruction to the vehicle-travel control device 30 when the vehicle 1 passes through the same place again. If the automated-driving management device 20 does not output an execution prohibition instruction to the vehicle-travel control device 30, the vehicle-travel control device 30 can switch to the vehicle operation by the travel assistance control. FIG. 4 shows, as an execution item of the travel assistance control, an example of giving the occupant an alarm indicating that the vehicle 1 is approaching a caution point when the vehicle 1 is at a point short of the caution point.

From this example, the execution mode may be such that when the vehicle 1 passes through the caution point, whether to make the travel assistance control more likely to be executed at a point short of the caution point is determined based on information whether the vehicle-travel control device 30 has a history of passing through the caution point with the vehicle-travel control device 30 having received an instruction to prohibit execution of the travel assistance control. However, it is assumed that the frequencies and times of the vehicle-travel control device 30 receiving an instruction to prohibit execution of the travel assistance control vary depending on the automated-driving management device 20 mounted on the vehicle 1. Hence, in the case in which the vehicle-travel control device 30 does not have a history of passing through the caution point with the vehicle-travel control device 30 having received an instruction to prohibit execution of the travel assistance control, the vehicle-travel control device 30 sets, based on the evaluation level of the automated-driving management device, the travel assistance control to an execution mode in which the travel assistance control is more likely to be executed at a point short of the caution point.

In Example 1, when recognizing that the vehicle 1 is approaching a caution point, following the target trajectory TR, the vehicle-travel control device 30 determines whether it has a history of passing through the caution point with the vehicle-travel control device 30 having received an instruction to prohibit execution of the travel assistance control. In the case in which the vehicle-travel control device 30 has received an execution prohibition instruction, and it is determined that the vehicle-travel control device 30 does not have a history of passing through the caution point, the vehicle-travel control device 30 estimates an evaluation level of the automated-driving management device 20. The vehicle-travel control device 30 changes, based on the estimated evaluation level, the execution mode of the travel assistance control such that the travel assistance control is more likely to be executed. With this configuration, in a situation in which execution of the travel assistance control by the vehicle-travel control device 30 is prohibited by the automated-driving management device 20, it is possible to ensure the travel safety of the vehicle from the standpoint of the vehicle-travel control device 30.

The automated-driving management device 20 and the vehicle-travel control device 30 may be separately designed and developed. For example, the vehicle-travel control device 30 that performs vehicle travel control is designed and developed by a developer familiar with mechanisms and vehicle kinematic characteristics (typically an automobile manufacturer). In this case, the reliability of the travel assistance control of the vehicle-travel control device 30 is extremely high. On the premise of using such travel assistance control having high reliability, an automated-driving-service provider can design and develop software for the automated-driving management device 20. In this sense, it can be said that the vehicle-travel control device 30 is a platform for an automated driving service.

Hereinafter, the vehicle-travel control device 30 of the vehicle control system 10 according to the present embodiment will be described in further detail.

2. Vehicle-Travel Control Device 30

2-1. Configuration Example

Figure 5:
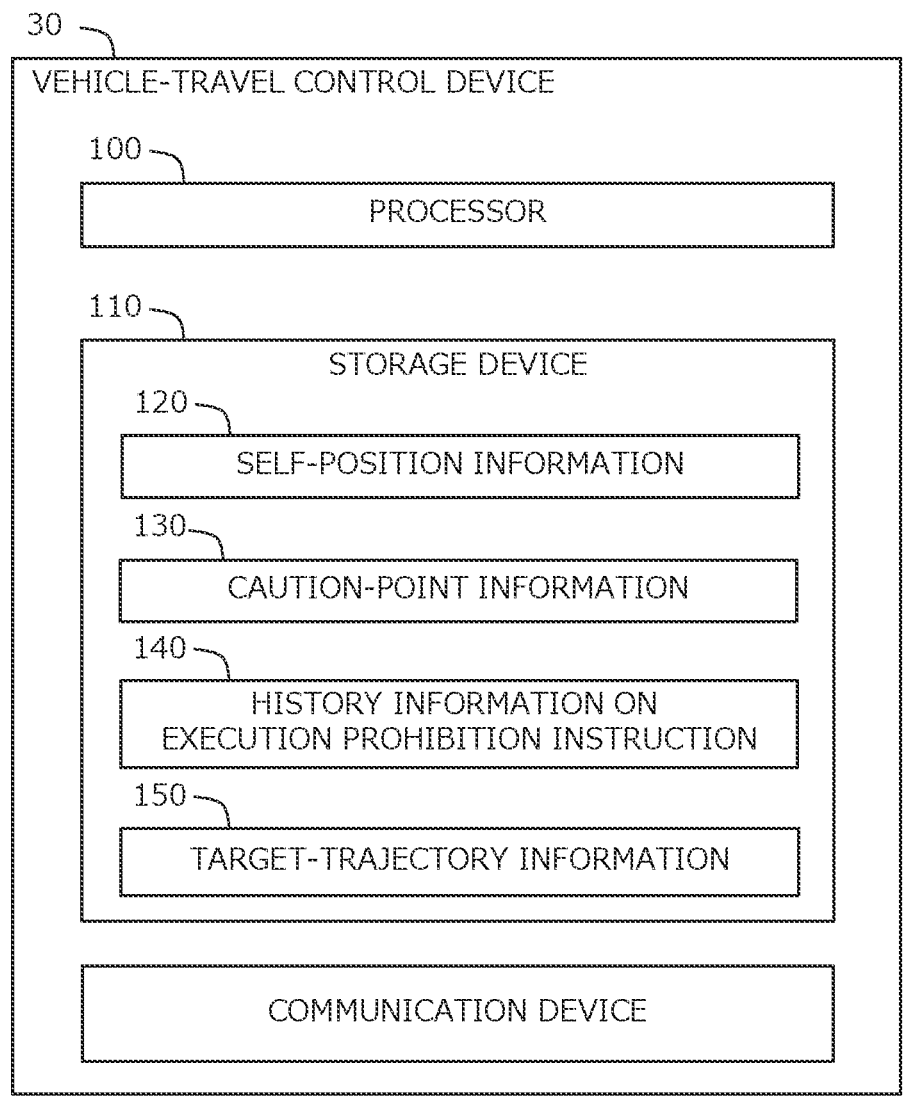
FIG. 5 is a block diagram showing a configuration example of a vehicle-travel control device according to the first embodiment.

FIG. 5 is a block diagram showing a configuration example of the vehicle-travel control device 30 according to the present embodiment. The vehicle-travel control device 30 performs various information processes. The vehicle-travel control device 30 includes one or a plurality of processors 100 (hereinafter, simply called a processor 100), one or a plurality of storage devices 110 (hereinafter, simply called a storage device 110), and a communication device capable of communicating with the automated-driving management device 20. The processor 100 executes various processes. Examples of the processor 100 include a CPU and an ECU. The storage device 110 stores data on self-position information 120, data on caution-point information 130, data on history information 140 on the execution prohibition instruction, and data on target-trajectory information 150. Examples of the storage device 110 include volatile memory, nonvolatile memory, an HDD, and an SSD. The functions of the vehicle-travel control device 30 are implemented by the processor 100 executing a vehicle-travel control program which is a computer program. The vehicle-travel control program is stored in the storage device 110. The vehicle-travel control program may be recorded in a computer-readable storage medium. The vehicle-travel control program may be provided via a network.

The self-position information 120 includes vehicle self-position information obtained from a GPS sensor mounted on the vehicle. The caution-point information 130 includes information indicating points where caution needs to be exercised in driving, obtained from a database or the like via the communication device. The history information 140 on the execution prohibition instruction includes information indicating points where the vehicle-travel control device 30 received an execution prohibition instruction to prohibit execution of travel assistance control from the automated-driving management device 20 via the communication device. The target-trajectory information 150 includes information on the target trajectory TR received from the automated-driving management device 20 via the communication device.

2-2. Details of Information Process

The vehicle-travel control device 30 changes the execution mode of the travel assistance control based on the self-position information 120, the caution-point information 130, the history information 140 on the execution prohibition instruction, and the target-trajectory information 150. The information process according to the present embodiment includes a characteristic process as described below.

Figure 6:
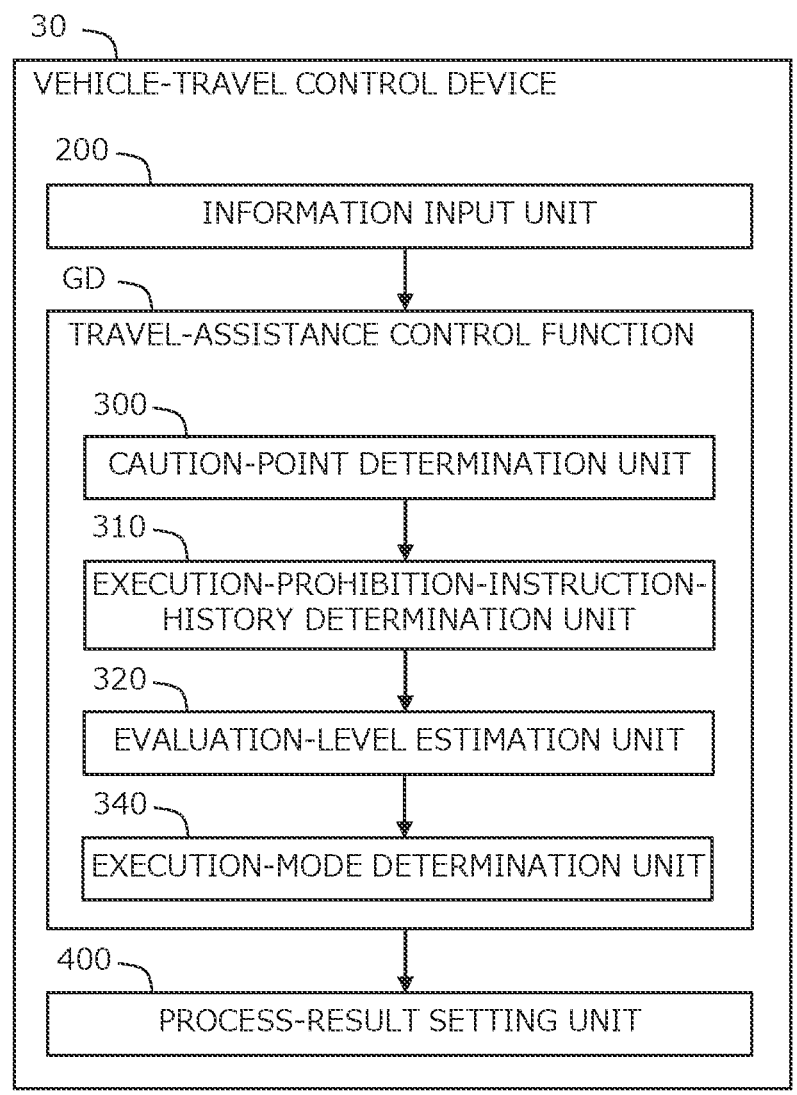
FIG. 6 is a block diagram showing an example of functions of the vehicle-travel control device according to the first embodiment.

FIG. 6 is a block diagram showing an example of functions of the vehicle-travel control device 30 according to the present embodiment. The vehicle-travel control device 30 includes, as functional blocks, an information input unit 200, the travel-assistance control function GD, and a process-result setting unit 400. These functional blocks are implemented by the processor 100 executing the vehicle-travel control program.

The information input unit 200 performs processes for receiving input of the self-position information 120, the caution-point information 130, the history information 140 on the execution prohibition instruction, and the target-trajectory information 150, recorded in the storage device 110. After that, the information input unit 200 outputs the inputted self-position information 120, the caution-point information 130, the history information 140 on the execution prohibition instruction, and the target-trajectory information 150, to the travel-assistance control function GD.

Further, the travel-assistance control function GD includes a caution-point determination unit 300, an execution-prohibition-instruction-history determination unit 310, an evaluation-level estimation unit 320, and an execution-mode determination unit 340. The travel-assistance control function GD changes the execution mode of the travel assistance control, based on the inputted self-position information 120, the caution-point information 130, the history information 140 on the execution prohibition instruction, and the target-trajectory information 150. Details of the processes by the caution-point determination unit 300, the execution-prohibition-instruction-history determination unit 310, the evaluation-level estimation unit 320, and the execution-mode determination unit 340 will be described later.

The caution-point determination unit 300 determines whether the self-position is approaching a caution point, based on the inputted self-position information 120 and the caution-point information 130. In the case in which the self-position is approaching a caution point, it is determined that the self-position is approaching a caution point. The process by the caution-point determination unit 300 will be described in detail later.

The execution-prohibition-instruction-history determination unit 310 determines whether the vehicle-travel control device 30 has a history of passing through the caution point with the vehicle-travel control device 30 having received an instruction to prohibit execution of the travel assistance control, based on the inputted caution-point information 130 and the history information 140 on the execution prohibition instruction. In the case in which it is determined that the vehicle-travel control device 30 has a history of passing through the caution point with the vehicle-travel control device 30 having received an instruction to prohibit execution of the travel assistance control, the vehicle-travel control device 30 changes the execution mode of the travel assistance control such that the travel assistance control is less likely to be executed. Details for the case in which it is determined that the vehicle-travel control device 30 does not have a history of passing through the caution point with the vehicle-travel control device 30 having received an instruction to prohibit execution of the travel assistance control will be described later.

In the case in which the result of determination by the execution-prohibition-instruction-history determination unit 310 is that the vehicle-travel control device 30 does not have a history of passing through the caution point with the vehicle-travel control device 30 having received an instruction to prohibit execution of the travel assistance control, the evaluation-level estimation unit 320 performs a process of estimating an evaluation level indicating an evaluation of the automated-driving management device 20 in levels. The evaluation level is estimated based on at least one factor out of the reception frequency of the execution prohibition instruction, the travel stability of the vehicle 1 following the target trajectory TR, and the travel safety of the vehicle 1 following the target trajectory TR. The reception frequency of the execution prohibition instruction is calculated based on the inputted history information 140 on the execution prohibition instruction. The stability and the safety are indicated in levels based on, for example, the deviation between the vehicle 1 and the target trajectory TR calculated by using the inputted self-position information 120 and the target-trajectory information 150.

The execution-mode determination unit 340 makes a determination to change the execution items of the travel assistance control and the execution time of the travel assistance control, based on the evaluation level estimated by the evaluation-level estimation unit 320. Specifically, when the evaluation level is high, a determination is made to change the execution items so as to only give an alarm to the occupant of the vehicle 1 at a point short of the caution point. When the evaluation level is low, a determination is made to change the execution items so as to performs, in addition to the execution item of giving an alarm to the occupant of the vehicle 1 at a point short of the caution point, at least one vehicle operation out of steering, acceleration, and deceleration of the vehicle. An example of the method of changing the execution items and execution time may be such that the storage device has list information on the execution items and execution time associated with the travel evaluation level, the estimated evaluation level and the travel evaluation level in the list information are compared, and after that, the execution items and execution time are changed to the ones associated with the travel evaluation level in the list information that matches the estimated evaluation level.

The process-result setting unit 400 generates various control instruction values for executing the travel assistance control, based on the execution items and execution time of the travel control assistance determined in the process result by the travel-assistance control function GD.

Figure 7:
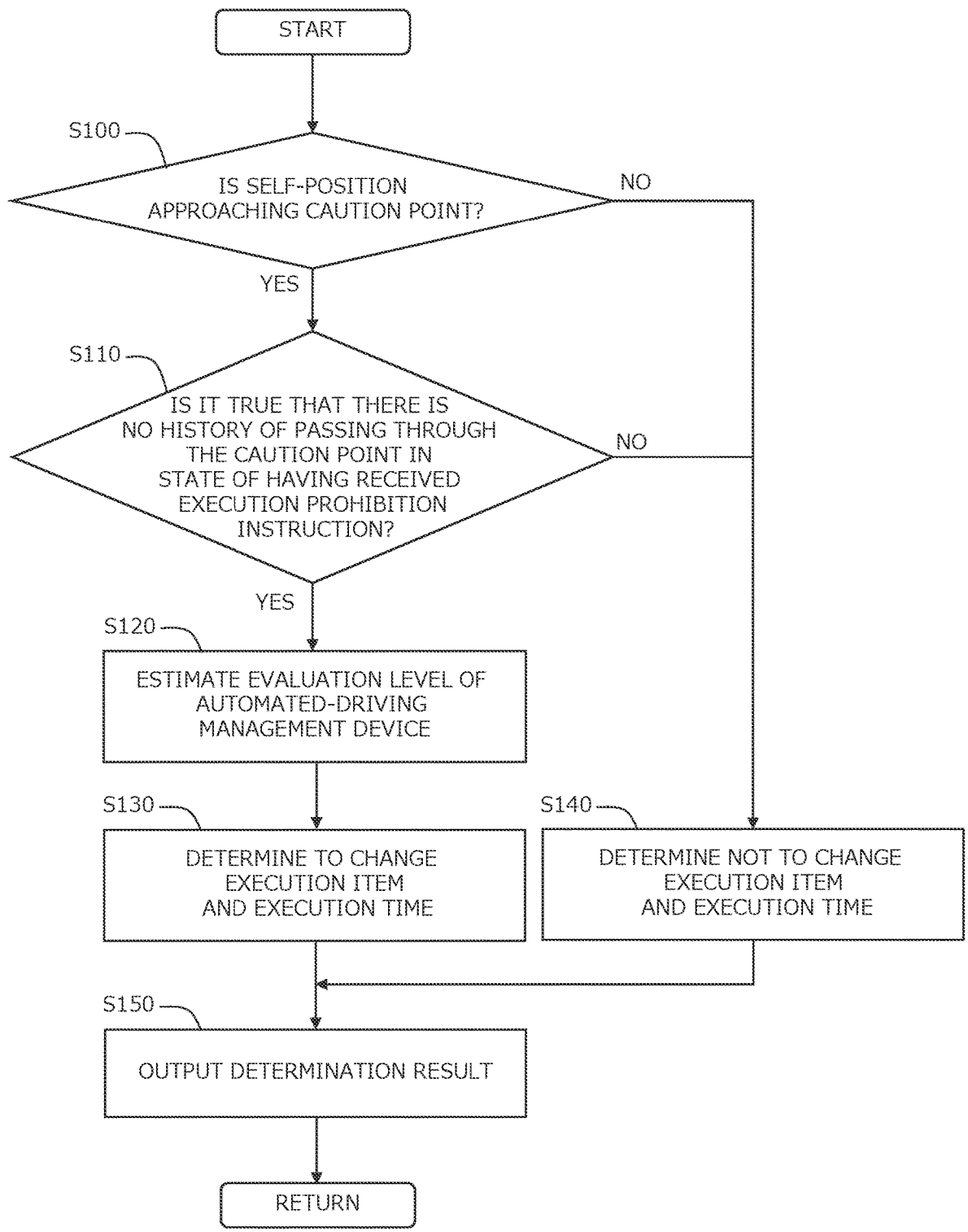
FIG. 7 is a flowchart showing a process example of the vehicle-travel control device according to the first embodiment.

FIG. 7 is a flowchart showing a process example of the travel-assistance control function GD of the vehicle-travel control device 30 according to the present embodiment.

In step S100, the travel-assistance control function GD determines whether the self-position is approaching a caution point.

In the case in which it is determined that the self-position is approaching a caution point (step S100; Yes), the process proceeds to step S110. In the other cases (step S100; No), the process proceeds to step S140.

In step S110, the travel-assistance control function GD determines whether the vehicle-travel control device 30 has a history of passing through the caution point with the vehicle-travel control device 30 having received an instruction to prohibit execution of the travel assistance control.

In the case in which it is determined that the vehicle-travel control device 30 does not have a history of passing through the caution point with the vehicle-travel control device 30 having received an instruction to prohibit execution of the travel assistance control (step S110; Yes), the process proceeds to step S120. In the other cases (step S110; No), the process proceeds to step S140.

In step S120, the travel-assistance control function GD estimates the evaluation level of the automated-driving management device 20. After that, the process proceeds to step S130.

In step S130, the travel-assistance control function GD makes a determination to change the execution items of the travel assistance control and the execution time of the travel assistance control, based on the estimated evaluation level.

In step S140, the travel-assistance control function GD makes a determination not to change the execution items of the travel assistance control and the execution time of the travel assistance control.

In step S150, the travel-assistance control function GD outputs the determined results.

Figure 8:
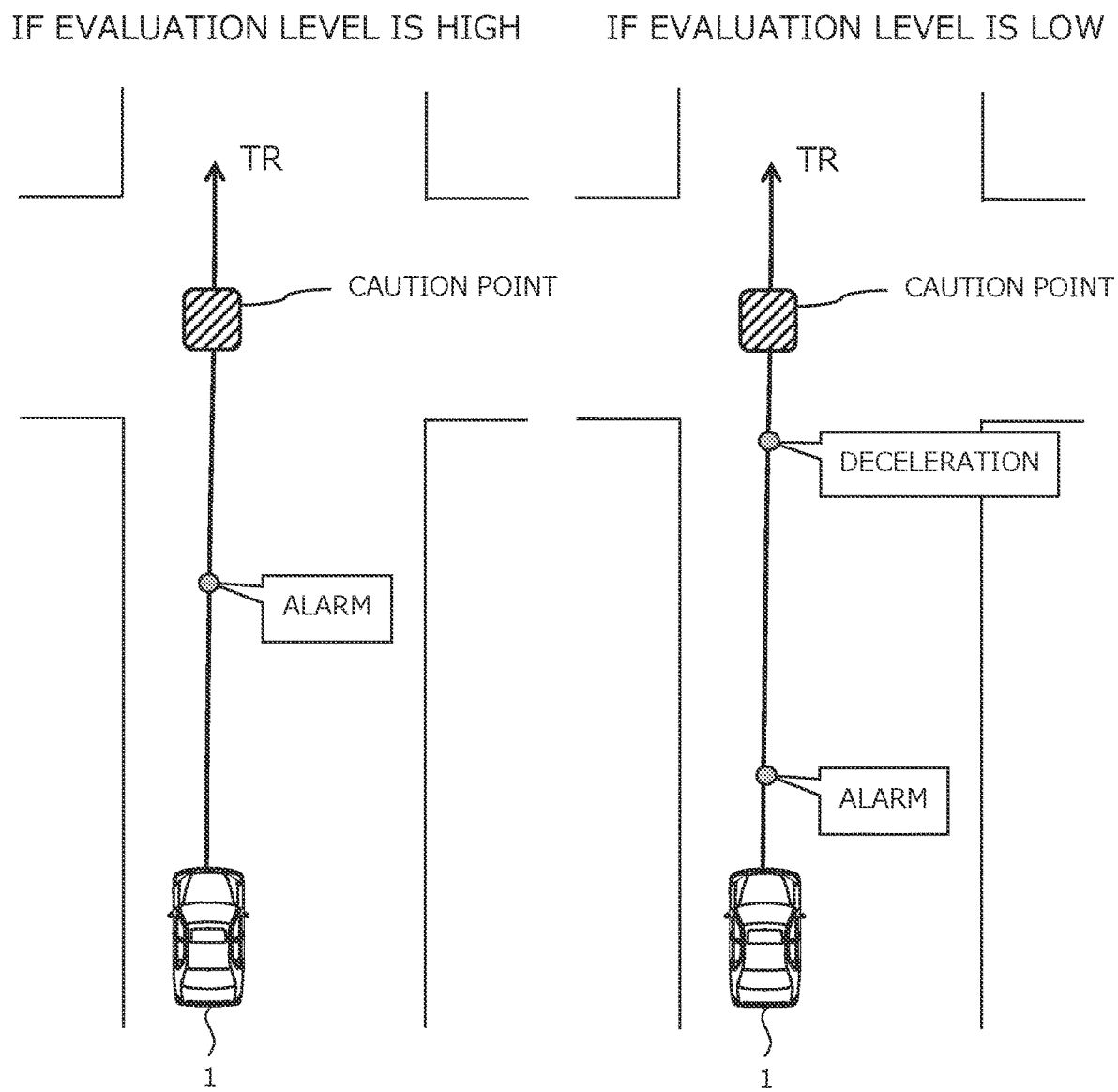
FIG. 8 is a diagram showing an example of processing results by the vehicle-travel control device according to the first embodiment.

FIG. 8 is a diagram showing an example of processing results by the vehicle-travel control device 30 according to the present embodiment. This is an example in which the travel assistance control is executed in the case in which it is determined that the vehicle-travel control device 30 does not have a history of passing through the caution point with the vehicle-travel control device 30 having received an instruction to prohibit execution of the travel assistance control. Specifically, the example shows that the execution items and execution time of the travel assistance control are different between in the case in which the evaluation level of the automated-driving management device 20 is high and in the case in which the evaluation level of the automated-driving management device 20 is low. For example, in the case in which the evaluation level is high, travel support control of giving an alarm to the occupant of the vehicle 1 at a point short of the caution point is executed. In the case in which the evaluation level is low, travel support control of giving an alarm to the occupant of the vehicle 1 at a point short of the caution point is executed earlier than in the case in which the evaluation level is high. Further, in the case in which the evaluation level is low, the execution items of the travel assistance control include, in addition to the alarm to the occupant, a vehicle operation of decelerating the vehicle.

Second Embodiment

1. Overview

In the first embodiment, it is determined by using the history information 140 on the execution prohibition instruction whether the vehicle-travel control device 30 has a history of passing through the caution point with the vehicle-travel control device 30 having received an instruction to prohibit execution of the travel assistance control. In other words, this operation is based on the routes on which the vehicle 1 has ever passed through a caution point. The second embodiment is different from the first embodiment in that the history information 140 on the execution prohibition instruction is not used to change the execution mode of the travel assistance control such that the travel assistance control is more likely to be executed or such that the travel assistance control is less likely to be executed. With this configuration, it is possible to change the execution mode of the travel assistance control also in routes on which the vehicle 1 has never passed through a caution point.

In the second embodiment, the evaluation level of the automated-driving management device 20 is estimated, and it is determined whether the estimated evaluation level is lower than a threshold. In the case in which it is determined that the evaluation level is lower than the threshold, the execution mode of the travel assistance control is changed based on the evaluation level lower than the threshold such that the travel assistance control is more likely to be executed. With this configuration, it is possible to ensure the travel safety of the vehicle from the standpoint of the vehicle-travel control device 30 also in routes on which the vehicle 1 has never passed through a caution point.

Hereinafter, the vehicle-travel control device 30 of the vehicle control system 10 according to the second embodiment will be described in further detail.

2. Vehicle-Travel Control Device 30

Figure 9:
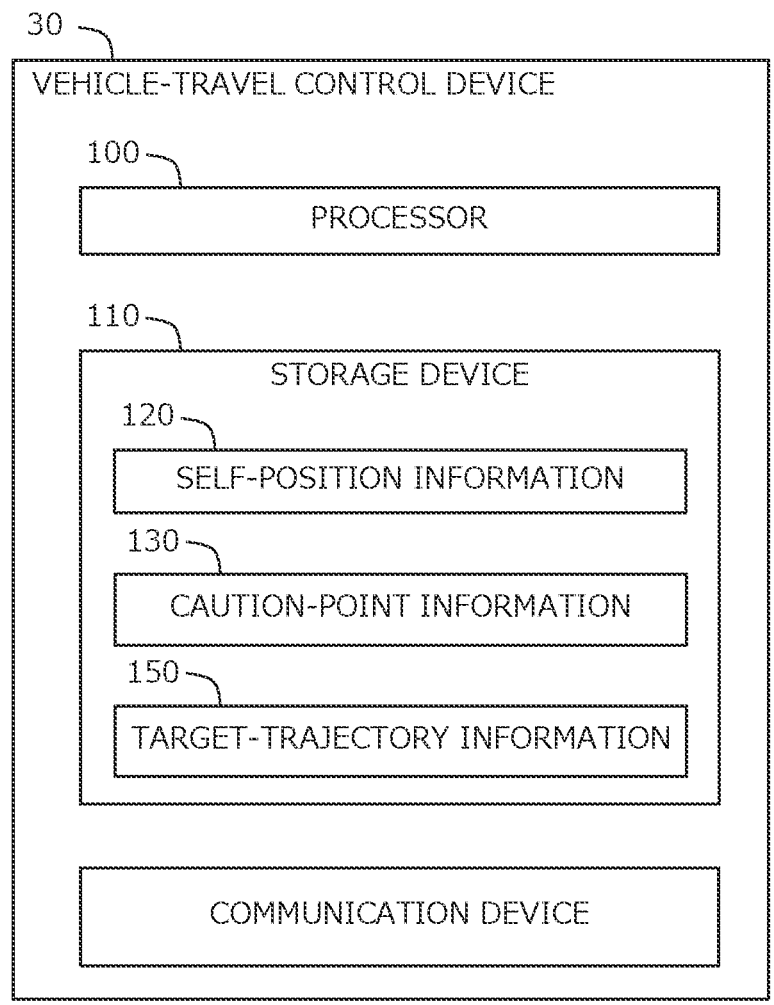
FIG. 9 is a block diagram showing a configuration example of a vehicle-travel control device according to a second embodiment.

FIG. 9 is a block diagram showing a configuration example of the vehicle-travel control device 30 according to the present embodiment. The difference from the first embodiment is the data stored in the storage device 110. The storage device 110 stores data on the self-position information 120, data on the caution-point information 130, and data on the target-trajectory information 150.

Figure 10:
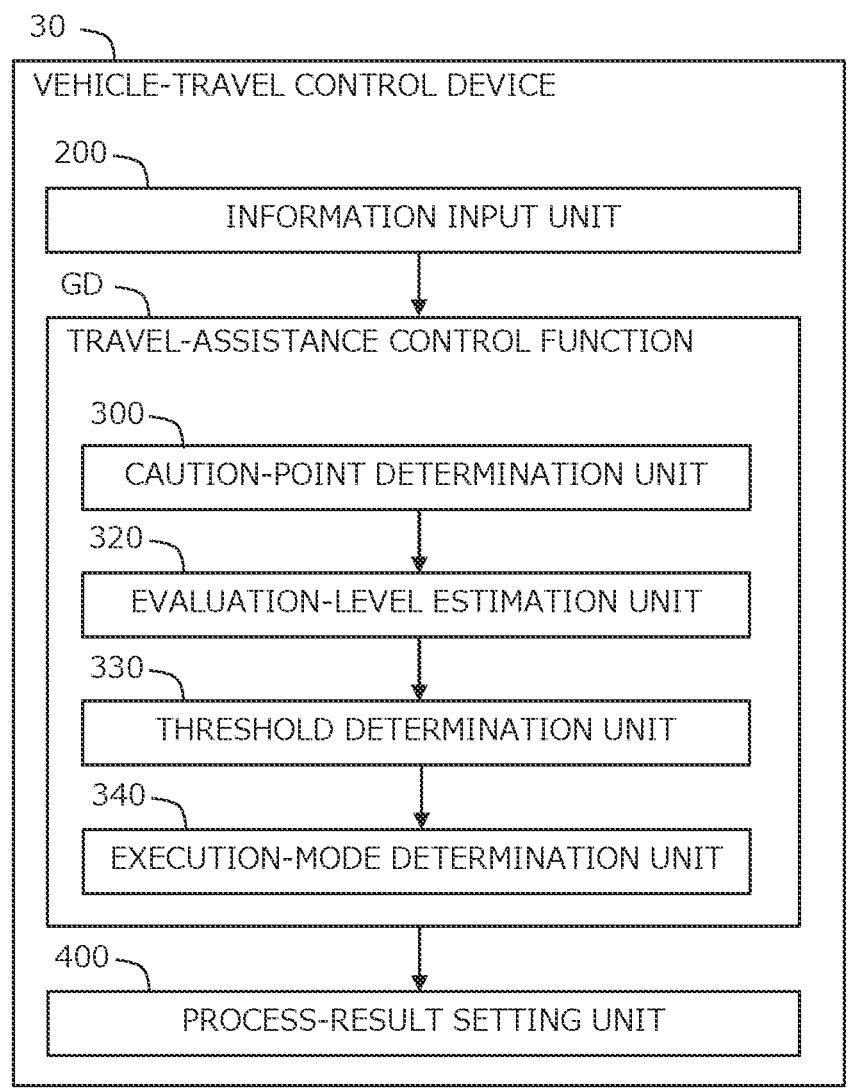
FIG. 10 is a block diagram showing an example of functions of the vehicle-travel control device according to the second embodiment.

FIG. 10 is a block diagram showing an example of functions of the vehicle-travel control device 30 according to the present embodiment. The difference from the first embodiment is the internal functions of the travel-assistance control function GD. The travel-assistance control function GD includes the caution-point determination unit 300, the evaluation-level estimation unit 320, a threshold determination unit 330, and the execution-mode determination unit 340. The travel-assistance control function GD changes the execution mode of the travel assistance control, based on the inputted self-position information 120, the caution-point information 130, and the target-trajectory information 150. The processes by the caution-point determination unit 300, the evaluation-level estimation unit 320, the threshold determination unit 330, and the execution-mode determination unit 340 will be described in detail later.

The caution-point determination unit 300 determines whether the self-position is approaching a caution point, based on the inputted self-position information 120 and the caution-point information 130. In the case in which the self-position is approaching a caution point, it is determined that the self-position is approaching a caution point. The process by the caution-point determination unit 300 will be described in detail later.

The evaluation-level estimation unit 320 performs a process of estimating an evaluation level indicating an evaluation of the automated-driving management device 20 in levels. The evaluation level is estimated based on at least one factor out of the travel stability of the vehicle 1 following the target trajectory TR and the travel safety of the vehicle 1 following the target trajectory TR.

The threshold determination unit 330 performs a process of determining whether the evaluation level estimated by the evaluation-level estimation unit 320 is lower than the threshold. Note that the configuration may be such that the threshold set for the threshold determination can be changed based on the state of the evaluation level of the automated-driving management device 20. The process by the threshold determination unit 330 will be described in detail later.

In the case in which the threshold determination unit 330 determines that the evaluation level is lower than the threshold, the execution-mode determination unit 340 makes a determination to change the execution items of the travel assistance control and the execution time of the travel assistance control, based on the evaluation level lower than the threshold.

Figure 11:
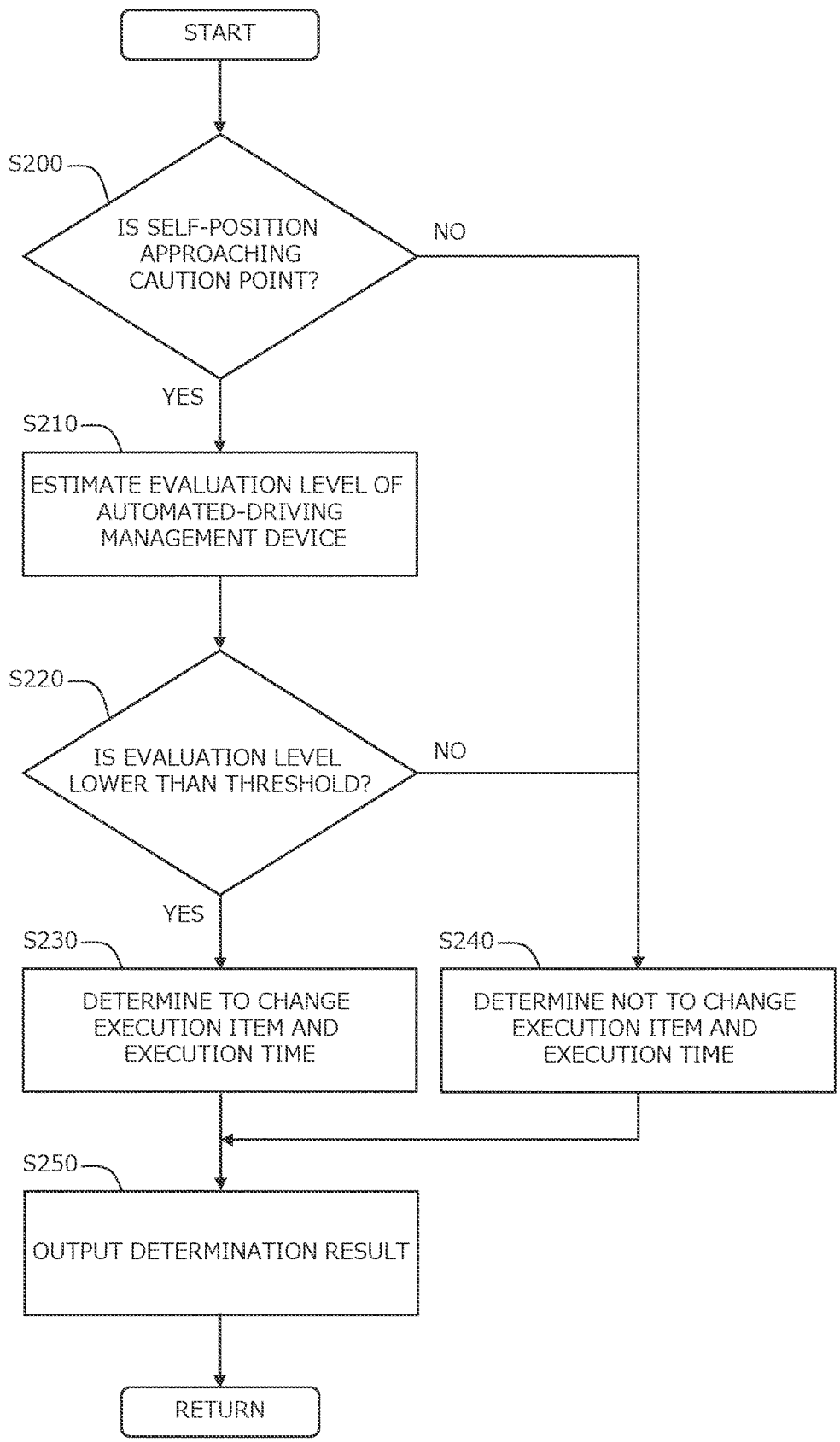
FIG. 11 is a flowchart showing a process example of the vehicle-travel control device according to the second embodiment.

FIG. 11 is a flowchart showing a process example of the travel-assistance control function GD of the vehicle-travel control device 30 according to the present embodiment.

In step S200, the travel-assistance control function GD determines whether the self-position is approaching a caution point.

In the case in which it is determined that the self-position is approaching a caution point (step S200; Yes), the process proceeds to step S210. In the other cases (step S200; No), the process proceeds to step S240.

In step S210, the travel-assistance control function GD estimates the evaluation level of the automated-driving management device 20. After that, the process proceeds to step S220.

In step 220, the travel-assistance control function GD determines whether the evaluation level is lower than the threshold.

In the case in which it is determined that the evaluation level is lower than the threshold (step S220; Yes), the process proceeds to step S230. In the other cases (step S220; No), the process proceeds to step S240.

In step S230, the travel-assistance control function GD makes a determination to change the execution items of the travel assistance control and the execution time of the travel assistance control, based on the evaluation level lower than the threshold.

In step S240, the travel-assistance control function GD makes a determination not to change the execution items of the travel assistance control and the execution time of the travel assistance control.

In step S250, the travel-assistance control function GD outputs the determined results.

What is claimed is:

1. A vehicle control system comprising:
an automated-driving management device that generates a target trajectory for a vehicle; and
a vehicle-travel control device that executes vehicle travel control for the vehicle to follow the target trajectory and travel assistance control for the vehicle,
wherein the vehicle-travel control device is configured to:
estimate an evaluation level of the automated-driving management device from a standpoint of the vehicle-travel control device;
when the vehicle is approaching a caution point indicating a point where caution needs to be exercised in driving, determine whether the vehicle-travel control device has a history of passing through the caution point with the vehicle-travel control device having received an execution prohibition instruction to prohibit execution of the travel assistance control; and
when the vehicle-travel control device has received the execution prohibition instruction, and it is determined that the vehicle-travel control device does not have a history of passing through the caution point, change an execution mode of the travel assistance control based on the evaluation level such that the travel assistance control is more likely to be executed.

2. The system according to claim 1,
wherein the vehicle-travel control device is configured to:
when the vehicle-travel control device has received the execution prohibition instruction, and it is determined that the vehicle-travel control device has a history of passing through the caution point, change the execution mode based on the evaluation level such that the travel assistance control is less likely to be executed.

3. The system according to claim 1,
wherein the execution mode includes an execution item of the travel assistance control and execution time of the travel assistance control.

4. The system according to claim 3,
wherein the execution item includes an alarm for notifying an occupant that the vehicle is approaching the caution point and at least one vehicle operation out of steering, acceleration, and deceleration of the vehicle performed at a point short of the caution point when the vehicle passes through the caution point.

5. The system according to claim 1, wherein the evaluation level is estimated based on at least one factor out of reception frequency of the execution prohibition instruction, travel stability of the vehicle following the target trajectory, and travel safety of the vehicle following the target trajectory.

6. A vehicle control system comprising:
an automated-driving management device that generates a target trajectory for a vehicle; and
a vehicle-travel control device that executes vehicle travel control for the vehicle to follow the target trajectory and travel assistance control for the vehicle,
wherein the vehicle-travel control device is configured to:
determine whether an evaluation level of the automated-driving management device from a standpoint of the vehicle-travel control device is lower than a threshold, and
when the vehicle is approaching a caution point indicating a point where caution needs to be exercised in driving, and it is determined that the vehicle-travel control device has a history of passing through the caution point, and it is determined that the evaluation level is lower than the threshold, change an execution mode of the travel assistance control such that the travel assistance control is more likely to be executed.

7. The system according to claim 6, wherein the vehicle-travel control device is configured to:
when the vehicle is approaching a point where caution needs to be exercised in driving, and it is determined that the evaluation level is higher than or equal to the threshold, change the execution mode of the travel assistance control such that the travel assistance control is less likely to be executed.

8. The system according to claim 6, wherein the execution mode includes an execution item of the travel assistance control and execution time of the travel assistance control.

9. The system according to claim 8, wherein the execution item includes an alarm for notifying an occupant that the vehicle is approaching the caution point and at least one vehicle operation out of steering, acceleration, and deceleration of the vehicle performed at a point short of the caution point when the vehicle passes through the caution point.

10. The system according to claim 6, wherein the evaluation level is estimated based on at least one factor out of travel stability of the vehicle following the target trajectory and travel safety of the vehicle following the target trajectory.

11. A method of controlling a vehicle, involving execution of vehicle travel control for the vehicle to follow a target trajectory for the vehicle and travel assistance control for the vehicle, the method comprising the steps of:
estimating an evaluation level of an automated-driving management device that generates the target trajectory;
determining, when the vehicle is approaching a caution point indicating a point where caution needs to be exercised in driving, whether a vehicle-travel control device has a history of passing through the caution point in a state of having received an execution prohibition instruction to prohibit execution of the travel assistance control from the automated-driving management device; and
changing, when the vehicle-travel control device has received the execution prohibition instruction, and it is determined that the vehicle-travel control device does not have a history of passing through the caution point, an execution mode of the travel assistance control based on the evaluation level such that the travel assistance control is more likely to be executed.

* * * * *